(12) United States Patent
Neugebauer et al.

(10) Patent No.: US 7,946,924 B2
(45) Date of Patent: May 24, 2011

(54) SHAFT ASSEMBLY

(75) Inventors: Lüder Neugebauer, Hannover (DE);
Jürgen Maretzke, Isenbüttel (DE);
Jürgen Linzmeier, Gifhorn (DE);
Matthias Voigt, Nordgermersleben (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 12/625,745

(22) Filed: Nov. 25, 2009

(65) Prior Publication Data

US 2010/0075766 A1 Mar. 25, 2010

Related U.S. Application Data

(63) Continuation of application No. 11/715,254, filed on Mar. 7, 2007, now abandoned, which is a continuation of application No. PCT/EP2005/008975, filed on Aug. 19, 2005.

(30) Foreign Application Priority Data

Sep. 7, 2004 (DE) .......................... 10 2004 043 621

(51) Int. Cl.
*F16D 3/06* (2006.01)
(52) U.S. Cl. ...................................... 464/162; 403/359.6
(58) Field of Classification Search .................. 464/162, 464/182; 403/359.5, 359.6
See application file for complete search history.

(56) References Cited

U.S. PATENT DOCUMENTS

| 3,016,722 | A | 5/1959 | Batdorf |
| 2,895,345 | A | 7/1959 | McClure |
| 3,197,216 | A | 7/1965 | Jackson |
| 3,290,918 | A * | 12/1966 | Weasler ............... 403/359.6 X |
| 4,915,536 | A * | 4/1990 | Bear et al. ............. 403/359.6 X |
| 5,685,565 | A | 11/1997 | Schäfer et al. |
| 5,813,794 | A | 9/1998 | Castellon |
| 6,099,036 | A | 8/2000 | Fujiu et al. |
| 6,186,697 | B1 | 2/2001 | Masuda et al. |
| 6,193,612 | B1 | 2/2001 | Craig et al. |
| 6,279,221 | B1 | 8/2001 | Glowacki et al. |
| 2007/0178975 | A1 | 8/2007 | Neugebauer et al. |

FOREIGN PATENT DOCUMENTS

| DE | 41 19 359 A1 | 1/1992 |
| DE | 195 04 036 C1 | 6/1996 |
| DE | 197 15 744 A1 | 10/1997 |
| DE | 198 09 197 A1 | 10/1998 |
| EP | 1 031 747 A2 | 8/2000 |
| WO | 2006027094 A1 | 3/2006 |

OTHER PUBLICATIONS

International Search Report, dated Dec. 29, 2005.

* cited by examiner

*Primary Examiner* — Greg Binda

(57) ABSTRACT

A telescopable shaft assembly has at least two shaft elements capable of sliding in one another as an internal shaft element and an outer shaft element connected to one another in torque transmitting manner via at least one sliding splined portion. An axial fixation defines predetermined breaking point between the shaft elements. The axial fixation becomes ineffective once a predetermined impact force acting in a telescoping direction is reached. The shaft elements are movable relative to one another, once the axial fixation has become ineffective, in low-friction manner along the sliding splined portion under the action of the impact force. When the axial fixation is effective, an annular gap is formed between a splined portion runout on a free end of the outer shaft element and an unsplined portion of the inner shaft element. The annular gap, at least in the area of the free end of the outer shaft element, is at least partially filled with a sealant.

15 Claims, 4 Drawing Sheets

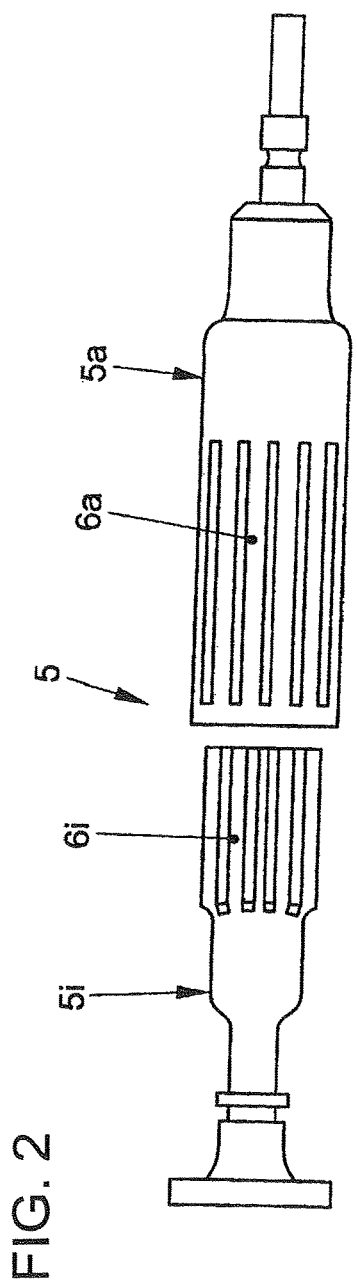
FIG. 2
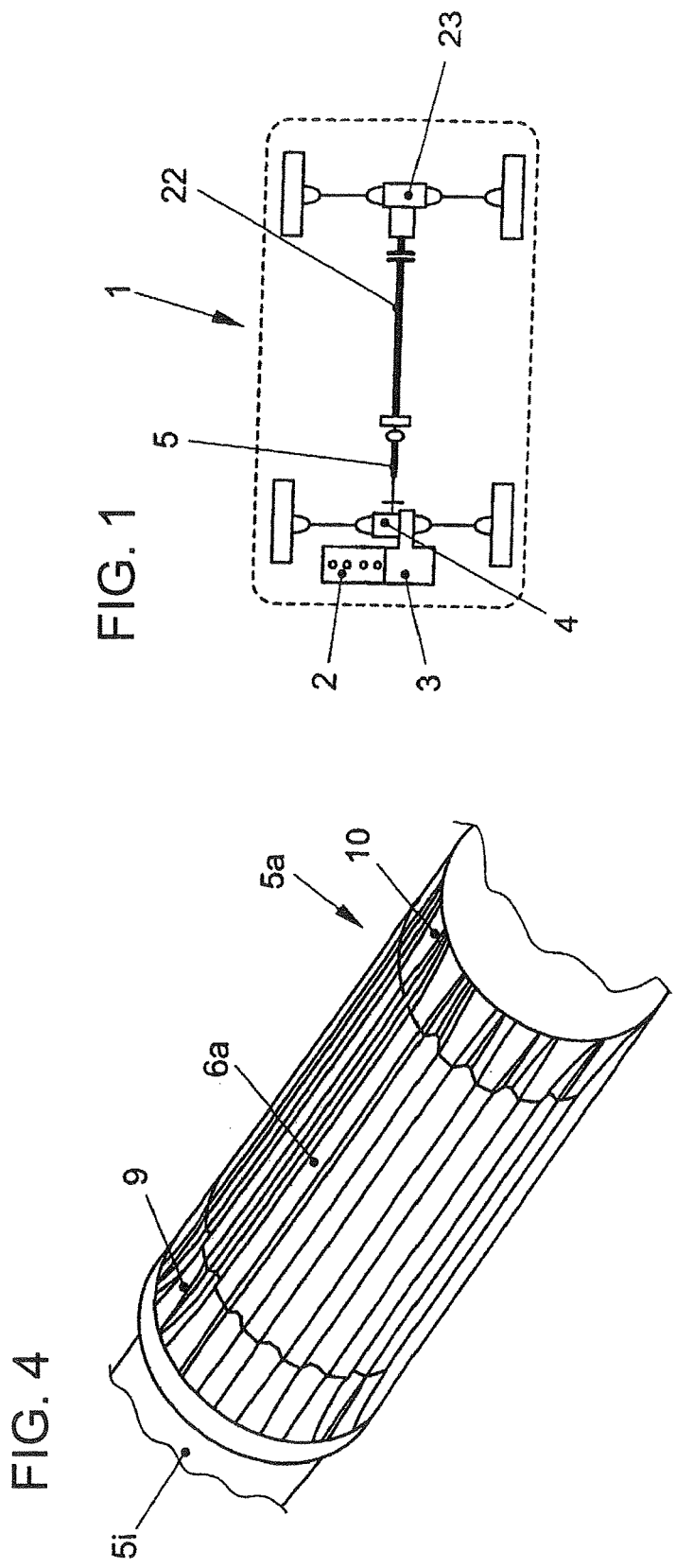
FIG. 1
FIG. 4

SHAFT ASSEMBLY

CROSS-REFERENCE TO RELATED APPLICATIONS

This application is a continuation, under 35 U.S.C. §120, of patent application Ser. No. 11/715,254, filed Mar. 7, 2007, now abandoned; which was a continuation, under 35 U.S.C. §120, of copending international application PCT/EP2005008975, filed Aug. 19, 2005, which designated the United States; this application also claims the priority, under 35 U.S.C. §119, of German patent application DE 10 2004 043 621.5, filed Sep. 7, 2004; the prior applications are herewith incorporated by reference in their entirety.

BACKGROUND OF THE INVENTION

Field of the Invention

The invention relates to a telescoping shaft assembly with at least two shaft elements capable of sliding in one another. The two elements form an internal shaft element on the one hand and an outer shaft element on the other hand, and they are connected to one another in torque transmitting manner via at least one sliding splined portion. An axial fixation is provided in the manner of a predetermined breaking point between the shaft elements. The axial fixation becomes ineffective once a predetermined impact force acting in the direction of telescoping is reached. The shaft elements are movable relative to one another, once the axial fixation has become ineffective, in low-friction manner along the sliding splined portion under the action of the impact force.

Shaft assemblies of the generic type are described, for example, in U.S. Pat. Nos. 6,279,221 and 6,193,612. In this connection, reference is also had to a publication entitled "slip-in-tube universal-joint shaft" technology (12th Aachen Colloquium "Automobile and Engine Technology", 2003, pp. 1485-95). One object of the shaft assembly described therein is to optimize collapse behavior in the event of a crash. To this end, it is proposed that, in the event of telescoping due to an accident, impact energy is at least partially absorbed by purposeful deformation. This is achieved, for example, by an inner shaft element being driven out of the splined portion into a tapered zone of an outer shaft element. Movement into the tapered zone brings about forced deformation of the inner shaft element, which ultimately results in the fragmentation of the end region of the inner shaft element.

SUMMARY OF THE INVENTION

It is accordingly an object of the invention to provide a shaft assembly, which overcomes the above-mentioned disadvantages of the heretofore-known devices and methods of this general type and which provides for a shaft assembly by way of which it is possible, in particular for all-wheel drive vehicles, to reduce the loads to which occupants are exposed in frontal-impact accidents.

With the foregoing and other objects in view there is provided, in accordance with the invention, a telescopable shaft assembly, comprising:

at least two shaft elements capable of sliding in one another, the shaft elements including an internal shaft element and an outer shaft element;
at least one sliding splined portion connecting the two shaft elements to one another in a torque transmitting manner;
an axial fixation forming a predetermined breaking point between the shaft elements, the axial fixation becoming ineffective once a predetermined impact force acting in a telescoping direction is reached;
the shaft elements being movable relative to one another, once the axial fixation has become ineffective, in low-friction manner along the sliding splined portion under action of the impact force;
the outer shaft element having a free end formed with a splined portion runout and the inner shaft element is formed with an unsplined portion;
wherein, when the axial fixation is effective, an annular gap is formed between the splined portion runout on the outer shaft element and the unsplined portion of the inner shaft element; and
a sealant at least partially filling the annular gap, at least in an area of the free end of the outer shaft element.

In contrast with the previous design philosophy with purposeful energy absorption during collapse of the telescopable shaft elements under crash conditions, it is now proposed according to the invention that an axial fixation designed for normal operation of the vehicle be provided, which fixation becomes ineffective in the event of a vehicle accident, thus for example fractures, tears, shears or the like, once a predetermined impact force is reached. Once this axial fixation configured in the manner of a predetermined breaking point has become ineffective, it no longer prevents the shaft elements from telescoping into one another, but instead permits low-friction telescoping of the shaft elements under the action of the impact force. A typical order of magnitude for design of the axial fixation may be a limit force of for example 5 to 40 kN (kilonewtons). If, in the event of a crash, the impact force reaches this predetermined limit force, the axial fixation is nullified and the impact force is thus opposed by a lower resistance.

The term "low-friction" as used herein is to be understood to mean that even forces of less than 50% to 10% of the designed limit force for the axial fixation are sufficient to move the shaft elements relative to one another.

A shaft assembly designed in this manner, in particular for a front cardan shaft (i.e., propshaft) in an all-wheel drive vehicle with a transverse, front-mounted engine, is advantageous because dispensing with deformation in the shaft assembly does not give rise to any hazard due to components snapping or breaking away. Any intrusion of such components into the passenger compartment is thus reliably avoided.

The axial fixation itself may preferably also be used at the same time to ensure exact alignment of the shaft axes with one another. Advantageously, such exact alignment is achieved, for example, by press fitting between the tooth tip and tooth root in the splined portion of at least one of the two shaft elements.

In order to increase the service life of shaft assemblies according to the invention, it is moreover provided that a seal is inserted into an annular gap arising between the shaft elements, which seal may, for example, assume the form of a sealing ring or a formless sealant of the paste or gel type. The sealant itself may take the form of an adhesive, which thus simultaneously assumes the axial fixation function. Additionally or alternatively, axial fixation may also be provided by an insert which may be fitted between the two shaft elements, the insert likewise preferably being associated with a sealing element.

To ensure an extended life of the entire shaft assembly, the splined portion is preferably introduced by cold forming, for example cold rolling.

In accordance with an added feature of the invention, the axial fixation is formed by an adhesive bond and/or weld and/or calking and/or a combination of shear elements and/or frictional portions in the sliding splined portion and/or the like.

In accordance with an additional feature of the invention, the annular gap is sealed by the sealant. In accordance with an additional feature of the invention, the sealant is a sealing ring or a formless sealant of the sealing cord, paste or gel type.

In an alternative embodiment, there is provided at least one bead formed in the sliding splined portion, the bead establishing a predetermined force/travel profile over a displacement path for the displacing impact force, once the axial fixation has become unfastened.

In accordance with another feature of the invention, the dimensions of the bead or beads are selected such that the displacement force exhibits a declining profile over the displacement path.

In accordance with a further feature of the invention, the outer shaft element comprises a taper on its end remote from the inner shaft element, by means of which taper it is possible to limit movement, determined by an impact force, of the inner shaft element within the outer shaft element in the manner of a limit stop.

In accordance with again an added feature of the invention, the inner shaft element comprises an unsplined portion on its end remote from the outer shaft element, the external diameter of which unsplined portion is smaller than the tip diameter of the splined portion of the outer shaft element to permit unimpeded movement of the outer shaft element through the inner shaft element.

In accordance with again an additional feature of the invention, for the purpose of torque transmission, the splined portions of the shaft elements are arranged relative to one another virtually without backlash.

In accordance with again another feature of the invention, on the inner shaft element, the diameter of the root circle of the splined portion is greater than the external diameter of the unsplined portion of the inner shaft element following on from the splined portion.

In accordance with again a further feature of the invention, the splined portion of the inner shaft element runs out in open manner at its end facing the outer shaft element.

In accordance with a concomitant feature of the invention, on the outer shaft element, the internal diameter of the unsplined portion is greater than the tip diameter on the splined portion of the inner shaft element.

Other features which are considered as characteristic for the invention are set forth in the appended claims.

Although the invention is illustrated and described herein as embodied in shaft assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 shows a typical installation situation for a shaft assembly according to the invention in a vehicle;

FIG. 2 shows, taking a cardan shaft by way of example, a shaft assembly according to the invention before assembly;

FIG. 4 shows a plan view of a portion IV indicated with dashed lines in FIG. 3;

DESCRIPTION OF THE PREFERRED EMBODIMENTS

Figure 6:
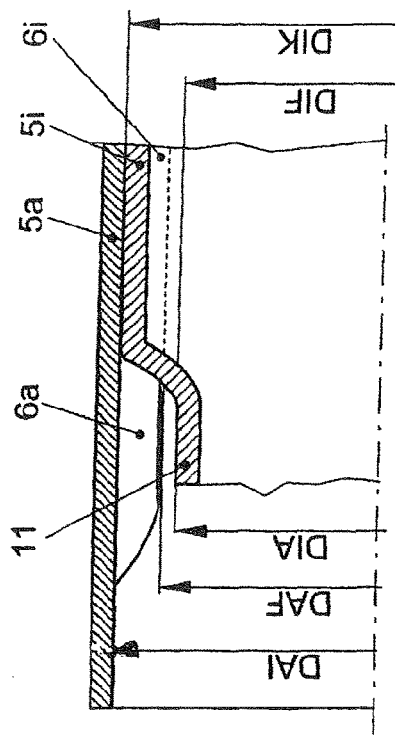
FIG. 6 shows a cutout VI of the portion shown with a continuous line in FIG. 5.

Referring now to the figures of the drawing in detail and first, particularly, to FIG. 1 thereof, there is seen a schematic diagram of a vehicle 1, also showing the essential elements of the drive train, including an internal combustion engine 2, a transmission 3, a differential 4, a front propshaft or cardan shaft 5, a rear propshaft or cardan shaft 22, a rear differential 23 together with universal-joint shafts and wheels, which have not been assigned reference numerals. The preferred implementation for the invention is in this case the front cardan shaft 5, the structure of which will now be explained in greater detail.

Figure 3:
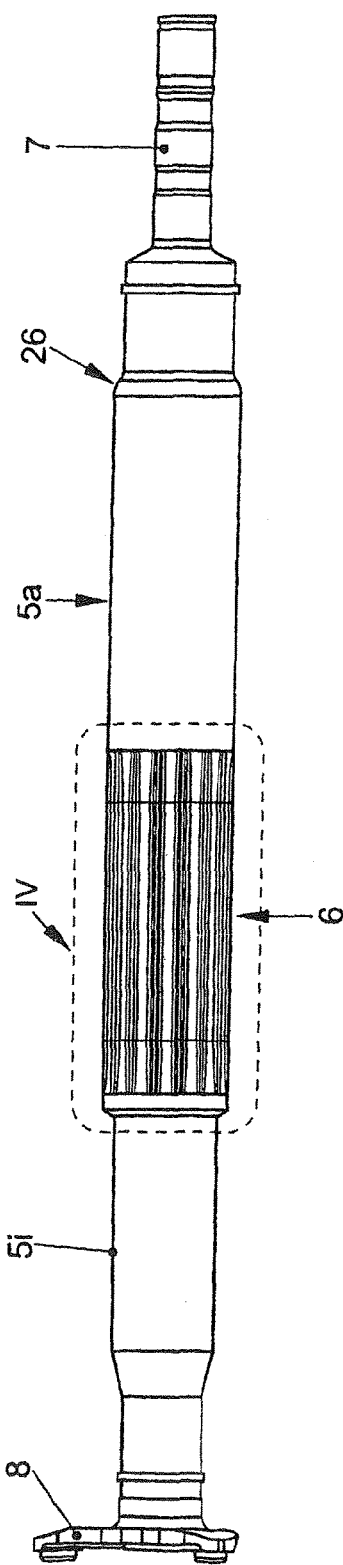
FIG. 3 shows the shaft assembly according to FIG. 2 in the assembled state.

FIG. 2, for example, illustrates the primarily important elements of the front cardan shaft 5, including an inner shaft element 5i, with an inner splined portion 6i, and an outer shaft element 5a, with an outer splined portion 6a. The splined portions 6i and 6a, also referred to as toothed shafts, together form the sliding splined portion 6, or sliding toothed shaft 6, visible in FIG. 3. The tubular shaft element 5a comprises a taper 7 for connection to a joint or flexible disk. The inner shaft element 5i, which preferably here also takes the form of a hollow tube, comprises on its end remote from the sliding splined portion 6 a connection flange 8 for connection to a joint or flexible disk. The configuration of the sliding splined portion 6 is, however, here primarily important to the invention, with FIG. 4 showing a plan view of the splined portion 6a.

Splined portion runouts 9 and 10 are primarily important to the splined portion 6a, which runouts are technically particularly straightforward to manufacture and, in particular in the area of the splined portion runout 9, also facilitate assembly for the inner shaft element 5i which is to be slid in. Beneath the splined portion runout 9, an annular gap 12 is obtained together with a portion 11, here unsplined, of the inner shaft element 5i, which annular gap, at least in the area of a free end 5e of the outer shaft element 5a, is at least partially filled with a sealant 13. At the free end, which has not been assigned a reference numeral, of the inner shaft element 5i, the splined portion 6i ends in open manner and is thus particularly easy to produce, for example by cold forming such as cold rolling.

The sketch in FIG. 6 clarifies the manner in which, after the axial fixation has been overcome, low-friction telescoping of the shaft elements 5a and 5i is possible. Accordingly, for example for the inner shaft element 5i, the external diameter DIA of the unsplined portion 11 is less than the tip diameter DAF on the outer shaft element 6a. Correspondingly, the diameter DAI of an unsplined portion within the outer shaft element 5a is greater than the tip diameter DIK on the inner shaft element 5i and the tip diameter DAF of the splined portion 6i on the outer shaft element is greater than the root diameter DIF on the inner shaft element 5i. These design features ensure low-friction relative movements between the shaft elements 5i and 5a, the extent of which movement may be limited by a taper 26 acting as an axial limit stop on the outer shaft element 5a. The distance of this taper 26 is selected such that, even at maximum displacement of the sliding splined portion 6, this limit stop is not reached, unless the shaft assembly were disassembled. As illustrated in FIG. 6, the external diameter DIA of the unsplined portion 11 is smaller than the root diameter DIF on the inner shaft element 5i.

Figure 7:
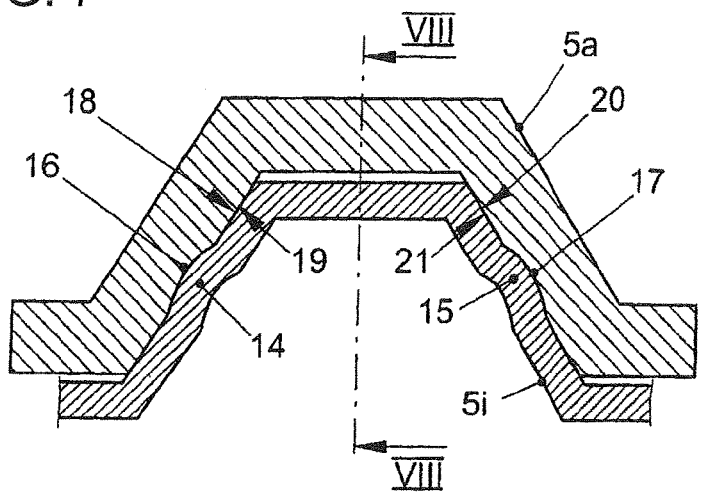
FIG. 7 shows a first longitudinal bead in one of the splines and further axial fixations in FIGS. 7A and 7B and 7C.

Examples of an axial fixation shown in FIG. 7 are beads 14 and 15 which have here been produced in the manner of a longitudinal bead, for example by calking, impact extrusion, rolling or pressing or the like. These longitudinal beads 14, 15 in the inner shaft element 5i cause indentations and, arising therefrom, undercuts 16, 17 in the outer shaft element 5a, such that axial fixation is achieved by means of this combination of interlocking and frictional connection. By way of kinematic reversal, such beads may, however, also be embossed from the outside into the outer shaft element 5a, such that a comparable retaining action is obtained. The virtual absence of backlash indicated in FIG. 7 between the tooth faces 18, 19 on the one hand and 20, 21 on the other hand is also of particular significance to the shaft assembly according to the invention. In this manner, it is ensured that the front cardan shaft 5 does not clatter (because circumferential and tilting backlash are minimized) or suffer unnecessary wear and, in the event of telescoping of the shaft elements 5a, 5i due to an accident, guidance in a defined manner is achieved. Circumferential backlash of 0 to 0.5 mm between the tooth faces 18, 19 and 20, 21 respectively for shaft diameters of between 60 mm and 70 mm is preferred for this virtually backlash-free design.

Figure 7A:
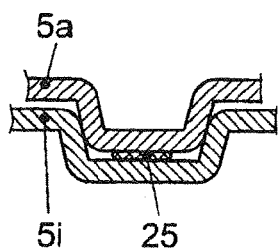
Figure 7B:
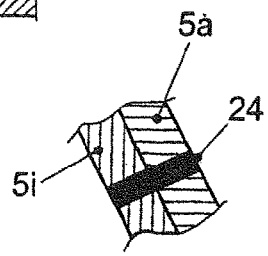
Figure 9:
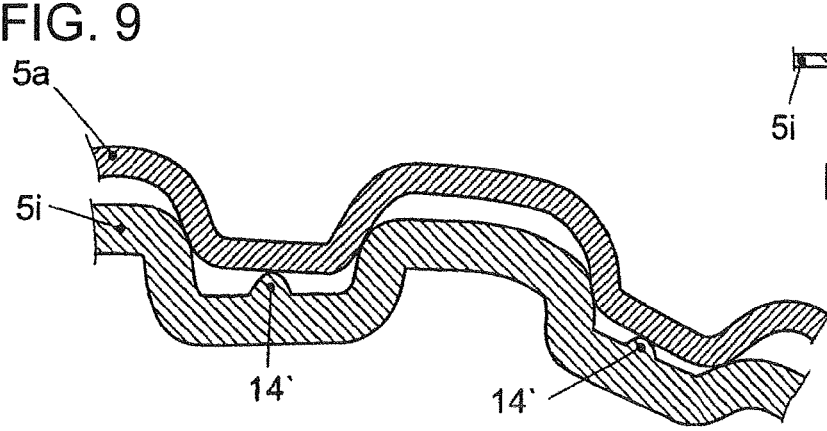
FIG. 9 shows another axial fixation by means of press fitting between tooth tip and tooth root.

Additionally or alternatively to the beads 14, 15, it is also possible to provide spots or extensive areas of curable plastics, adhesives or welds 25 (see FIG. 7a) and/or shearing pins 24 (see FIG. 7b). As a frictional connection variant, longitudinal beads 14' are also conceivable which may be integrally formed or applied in the area of the tooth root (see FIG. 9) or in the areas of the tooth tip (not shown here).

Figure 10:
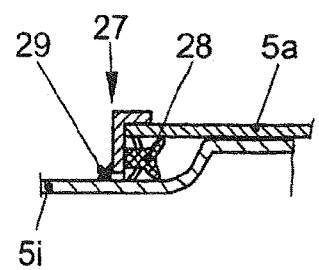
FIG. 10 shows another axial fixation by way of an insert.
Figure 7C:
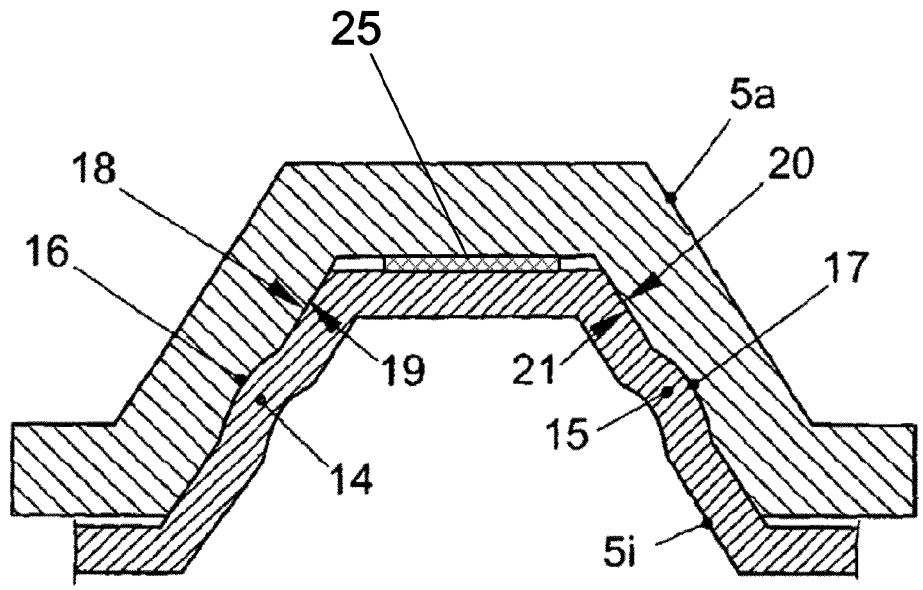
Figure 5:
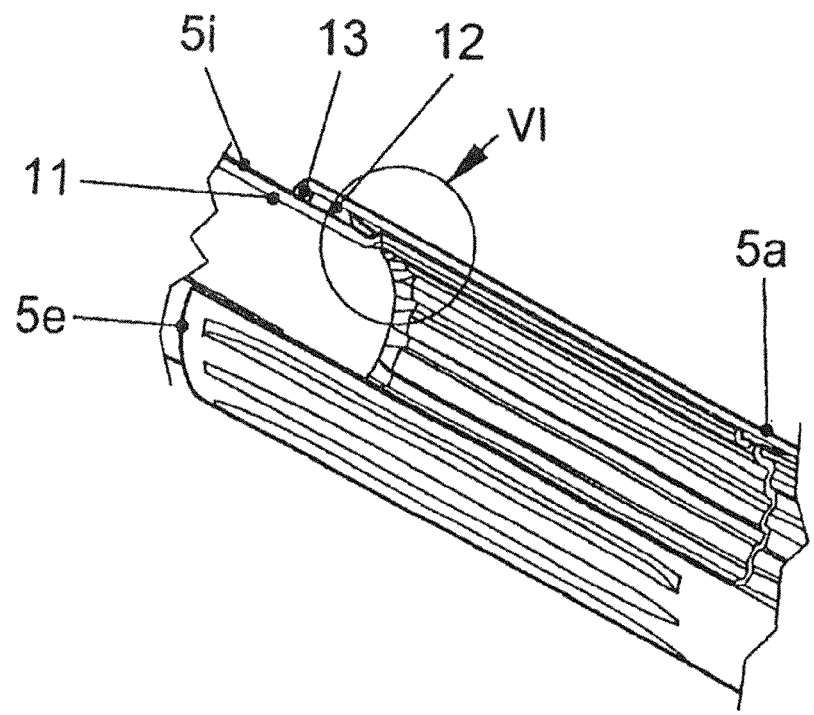
FIG. 5 shows, in a partial section, the internal view of two assembled shaft elements.

FIG. 10 shows an insert 27 as a further embodiment of an axial fixation, which is here fastened to the shaft element 5a and bears via a clamping member 28 and a sealing element 29 against the inner shaft element 5i. In this case too, kinematic reversal may be considered with regard to fastening the insert and the sealing and clamping functions. Depending on the design, undercuts or grooves may additionally be provided in the shaft elements 5a, 5i in order to ensure defined axial fixations and sealing conditions.

The beads 14, 14', 15 may be selected with regard to their length, width and height/depth or cross-sectional form in such a manner that, on the one hand, a defined limit force may be established and, on the other hand, a very specific characteristic curve may also be predetermined over the displacement path of the sliding splined portion 6. According to the invention, this characteristic curve of the displacement force exhibits a predominantly declining profile over the displacement path, such that no negative effects on the occupants accommodated in the vehicle 1 are to be anticipated on the part of the front cardan shaft 5. A distinction may be drawn between a first phase, in which, once the axial fixation has been nullified, the sliding splined portion 6 is still in engagement and predetermined force/travel profiles are accordingly established, and a second phase, in which the splined portions 6i and 6a are no longer in engagement, such that the shaft elements 5i, 5a slide past one another in virtually undamped manner. According to the invention, both phases are designed to be low-friction. At least the first phase exhibits the declining force/travel profile. In the second phase, the profile may optionally also be constant or rise slightly to a low level, but without regaining the force level of the first phase.

Figure 8:
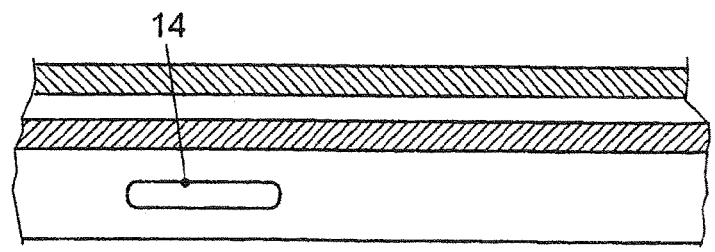
FIG. 8 shows a view according to section VIII-VIII in FIG. 7.

In order to establish a specific characteristic curve, the beads may also be arranged as transverse beads distributed around the circumference. In an embodiment as longitudinal bead, it is possible to provide a continuous profile (see FIG. 8) or a segmented assembly of a plurality of beads in succession.

In an assembly with a plurality of beads, it is also possible for at least one of the beads to be provided as a clamping bead for axial fixation and other beads to be designed to predetermine a specific characteristic curve over the displacement path. These beads may be assigned to the inner and/or outer shaft element 5i or 5a.

The characteristic curve may be established by varying not only the shape of the longitudinal beads but also the radial distribution thereof around the circumference of the shaft elements 5i and/or 5a.

Those skilled in the pertinent art will readily understand that the use of the shaft assembly according to the invention is not limited to the vehicle concept shown in FIG. 1, but it may also be selected for other drive configurations, for example with a continuous cardan shaft.

We claim:

1. A telescopable shaft assembly, comprising:
at least two shaft elements capable of sliding in one another, said shaft elements including an inner shaft element and an outer shaft element;
at least one sliding splined portion connecting said two shaft elements to one another in a torque transmitting manner, said sliding splined portion including an outer splined portion on said inner shaft element and an inner splined portion on said outer shaft element;
an axial fixation forming a predetermined breaking point between said shaft elements, said axial fixation becoming ineffective once a predetermined impact force acting in a telescoping direction is reached;
said shaft elements being movable relative to one another, once said axial fixation has become ineffective, in low-friction manner along said sliding splined portion under action of the impact force;
wherein at least one bead formed in said sliding splined portion is configured to establish a predetermined force/travel profile over a displacement path for the displacing impact force, once said axial fixation has become unfastened.

2. The shaft assembly according to claim 1, wherein said at least one bead has defined dimensions selected such that a displacement force exhibits a declining profile over the displacement path.

3. The shaft assembly according to claim 1, wherein said axial fixation is formed by one or more fixing means selected from the group consisting of an adhesive bond, a weld, a calking, a combination of shear elements, and frictional portions in said sliding splined portion.

4. The shaft assembly according to claim 1, wherein said outer shaft element is formed with a taper on on an end thereof remote from said inner shaft element, said taper forming a limit stop configured to limit movement, determined by an impact force, of said inner shaft element within said outer shaft element.

5. The shaft assembly according to claim 1, wherein said inner shaft element is formed with an unsplined portion on an end thereof remote from said outer shaft element, said unsplined portion having an outer diameter smaller than a tip diameter of said splined portion of said outer shaft element, permitting unimpeded movement of said outer shaft element over said inner shaft element.

6. The shaft assembly according to claim 1, wherein said outer splined portion on said inner shaft element and said inner splined portion on said outer shaft element are configured for torque transmission substantially without backlash.

7. The shaft assembly according to claim 1, wherein a root circle of said splined portion on said inner shaft element has a diameter greater than an external diameter of an unsplined portion of said inner shaft element following on from said splined portion.

8. The shaft assembly according to claim 1, wherein said outer splined portion of said inner shaft element runs out in open manner at an end thereof facing said outer shaft element.

9. The shaft assembly according to claim 1, wherein said outer shaft element is formed with an unsplined portion having an inner diameter greater than a tip diameter on said splined portion of said inner shaft element.

10. The shaft assembly according to claim 1, wherein, when said axial fixation is effective, an annular gap is formed between said splined portion runout on said outer shaft element and said unsplined portion of said inner shaft element, and which comprises a sealant at least partially filling said annular gap, at least in an area of said free end of said outer shaft element.

11. The shaft assembly according to claim 10, wherein said sealant is configured to seal said annular gap.

12. The shaft assembly according to claim 10, wherein said sealant is a sealing ring.

13. The shaft assembly according to claim 10, wherein said sealant is a formless sealant selected from the group consisting of a sealing cord, a sealing paste, and a gel sealant.

14. A telescopable shaft assembly, comprising:
- at least two shaft elements capable of sliding in one another, said shaft elements including an inner shaft element and an outer shaft element;
- at least one sliding splined portion connecting said two shaft elements to one another in a torque transmitting manner, said sliding splined portion including an outer splined portion on said inner shaft element and an inner splined portion on said outer shaft element;
- at least one bead in said sliding splined portion, said at least one bead forming an axial fixation with a predetermined breaking point between said shaft elements, said axial fixation becoming ineffective once a predetermined impact force acting in a telescoping direction is reached;
- said shaft elements being movable relative to one another, once said axial fixation has become ineffective, in low-friction manner along said sliding splined portion under action of the impact force, wherein said at least one bead formed in said sliding splined portion establishes a predetermined force/travel profile over a displacement path for the displacing impact force, once said axial fixation has become unfastened.

15. A telescopable shaft assembly, comprising:
- at least two shaft elements capable of sliding in one another, said shaft elements including an inner shaft element and an outer shaft element;
- at least one sliding splined portion connecting said two shaft elements to one another in a torque transmitting manner, said sliding splined portion including an outer splined portion on said inner shaft element and an inner splined portion on said outer shaft element;
- at least one clamping bead forming an axial fixation with a predetermined breaking point between said shaft elements, said axial fixation becoming ineffective once a predetermined impact force acting in a telescoping direction is reached;
- said shaft elements being movable relative to one another, once said axial fixation has become ineffective, in low-friction manner along said sliding splined portion under action of the impact force; and
- at least one further bead formed in said sliding splined portion, said at least one further bead establishing a predetermined force/travel profile over a displacement path for the displacing impact force, once said axial fixation has become unfastened.

* * * * *